United States Patent
Schmitt et al.

[11] Patent Number: 5,921,608
[45] Date of Patent: Jul. 13, 1999

[54] COVER FLAP FOR A PASSAGE OPENING IN A SIDE WALL OF A VEHICLE SITUATED ABOVE A FOLDING TOP BASE

[75] Inventors: Hans-Jürgen Schmitt, Mühlacker; Kurt Pfertner, Wimsheim; Matthias Aydt, Eberdingen; Uwe Henn, Wimsheim, all of Germany

[73] Assignee: Dr. Ing. H.c.F. Porsche AG, Weissach, Germany

[21] Appl. No.: 08/733,822

[22] Filed: Oct. 18, 1996

[30] Foreign Application Priority Data

Oct. 18, 1995 [DE] Germany .............. 195 38 738

[51] Int. Cl.6 ........................................ B60J 7/20
[52] U.S. Cl. .................... 296/107.08; 296/136
[58] Field of Search .................... 296/108, 136, 296/117, 107.08

[56] References Cited

U.S. PATENT DOCUMENTS

| | | | |
|---|---|---|---|
| 2,992,042 | 7/1961 | Gilson et al. | 296/136 |
| 4,799,729 | 1/1989 | Muscat | 296/136 |
| 5,620,226 | 4/1997 | Sautter, Jr. | 296/107 |

FOREIGN PATENT DOCUMENTS

| | | | |
|---|---|---|---|
| 0353203A1 | 1/1990 | European Pat. Off. | |
| 3801148C1 | 4/1989 | Germany | |
| 3903679C1 | 4/1990 | Germany | |
| 3939145A1 | 5/1991 | Germany | 296/136 |

*Primary Examiner*—Dennis H. Pedder
*Attorney, Agent, or Firm*—Evenson, McKeown, Edwards & Lenahan, PLLC

[57] ABSTRACT

A cover flap assembly is provided for a passage opening in a side wall of a vehicle situated above a folding top base. During the swivelling-out of a folding top deposited in an assigned folding top compartment, the cover flap can be changed from a covering position into an upright release position. The covering flap is in an operative connection with a carriage-type guiding device and extends in its upright release position in a sunk-in manner below the passage opening of the side wall.

29 Claims, 12 Drawing Sheets

COVER FLAP FOR A PASSAGE OPENING IN A SIDE WALL OF A VEHICLE SITUATED ABOVE A FOLDING TOP BASE

BACKGROUND AND SUMMARY OF THE INVENTION

This invention relates to a cover flap for a passage opening for a folding top linkage in a side wall of a vehicle situated above a folding top base.

In the case of known series-produced motor vehicles (for example, the BMW convertible), the folding top is divided into several four-bar sections so that, in the swivelled-back deposited position, it is accommodated in a relatively short folding top compartment which, however, has a large height. In such a folding top design, there is a relatively small passage opening for the folding top linkage so that, on their longitudinal sides facing the vehicle interior, the cover flaps are fastened in the manner of a hinge on the assigned side wall. When the folding top is swivelled out, the spring-loaded cover flaps are changed in the upward direction by means of the folding top linkage into an upright release position in which they project over the adjoining body in the upward direction.

It is an object of the invention to provide for a vehicle with a folding top compartment having a low height and a folding top linkage having only a four-bar arrangement on each longitudinal side, a cover flap for the resulting, relatively large-surface passage opening which, in its release position requires little space for its housing and, when the folding top is closed, does not project into the vehicle interior.

According to the invention, this object is achieved by providing an arrangement wherein the cover flap is in an operative connection with a carriage-type guiding device and, in its upright release position, extends in a sunk-in manner below the passage opening of the side wall.

Principal advantages achieved by means of the invention are that the large-surface cover flap interacting with a carriage-type guiding device extends in its upright release position sunk-in below the passage opening, whereby the cover flap, when the folding top is closed, does not project into the vehicle interior, and the free design of the folding top (for example, the interior headlining) is not impaired.

The movement of the carriage-type guiding device or of the cover flap is connected to the kinematics of the adjoining folding top compartment lid in such a manner that, when the folding top compartment lid is opened up, the cover flap is moved automatically from the covering position into the release position.

The folding top compartment lid is connected by way of a Bowden cable with the guiding device of the cover flap, the cover being opened up by means of the Bowden cable. The cover flap is closed by means of a tension spring which pulls up the carriage. The cover flap disappears by means of a combined rotating and linear movement below the adjoining panelling. The control of the rotating movement takes place by at least one cam plate. By means of a hinge pin, the cover flap is connected with the carriage of the guiding device. By means of slide elements, the carriage is held in position on a guide rail of the guiding device in a displaceable manner.

In its vertical release position, the cover flap fits into the space between the deposited folding top and the rear interior or the deposited folding top and the 3-point belt.

A detent pawl prevents the closing of the cover flap when the folding top compartment lid closes while the folding top is closed. The detent pawl fixes the carriage in its lower end position. The detent pawl is unlocked only when the folding top linkage swivels toward the rear and the cover flap is moved from its release position into the covering position.

A stop lever locks the carriage when the cover flap is closed and prevents that, when stressed, the cover flap dips away in the downward direction. In addition, the supporting control arm is blocked.

The guiding device is fastened on laterally exterior upright member of a transversely extending auxiliary frame fastened on the body side.

Other objects, advantages and novel features of the present invention will become apparent from the following detailed description of the invention when considered in conjunction with the accompanying drawings.

DETAILED DESCRIPTION OF THE DRAWINGS

Figure 1:
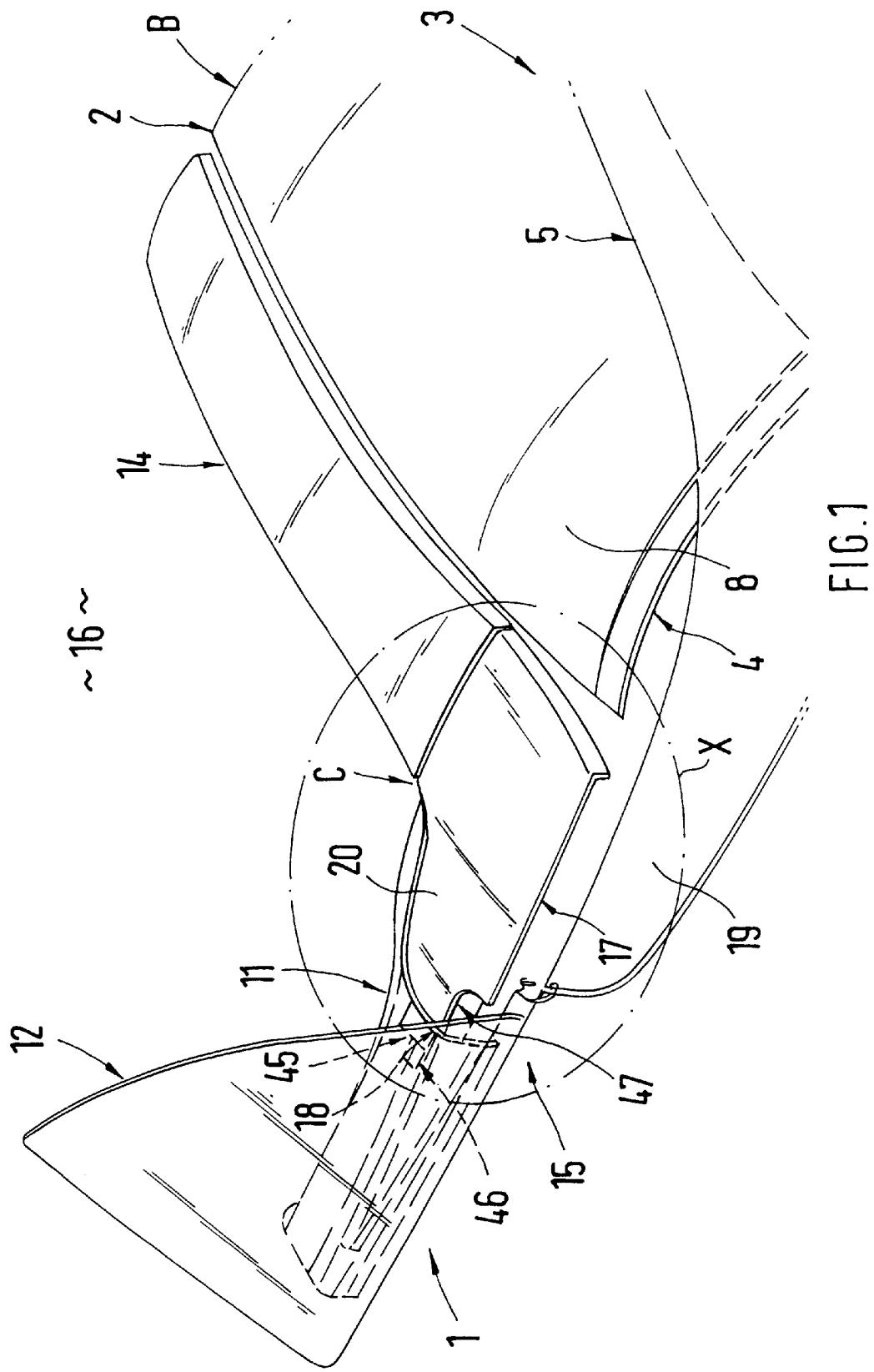
FIG. 1 is a perspective partial view diagonally from the rear of the rear-side passenger compartment, showing the folding top compartment lid, the rear side panelling, a transversely extending rearward panelling and a cover flap for a passage opening of a folding top linkage of a convertible, constructed according to a preferred embodiment of the present invention.

A vehicle formed by a convertible 1 has a folding top 2 which extends from a closed position not shown in detail but extending from a windshield frame—spanning a passenger compartment—to a rear area 3. In the folded-back deposited position B, the folding top 2 is accommodated in a rear-side folding top compartment 4 which, at least in sections, is covered in the upward direction by a folding top compartment lid 5. The folding top 2 is formed by a convertible top, a folding top or several adjoining, dimensionally stable folding top sections and is composed of a folding top linkage 7 (FIG. 7) which is pivotally connected to laterally exterior folding top bases 6 and of a folding top covering which is not shown in detail.

Figure 7:
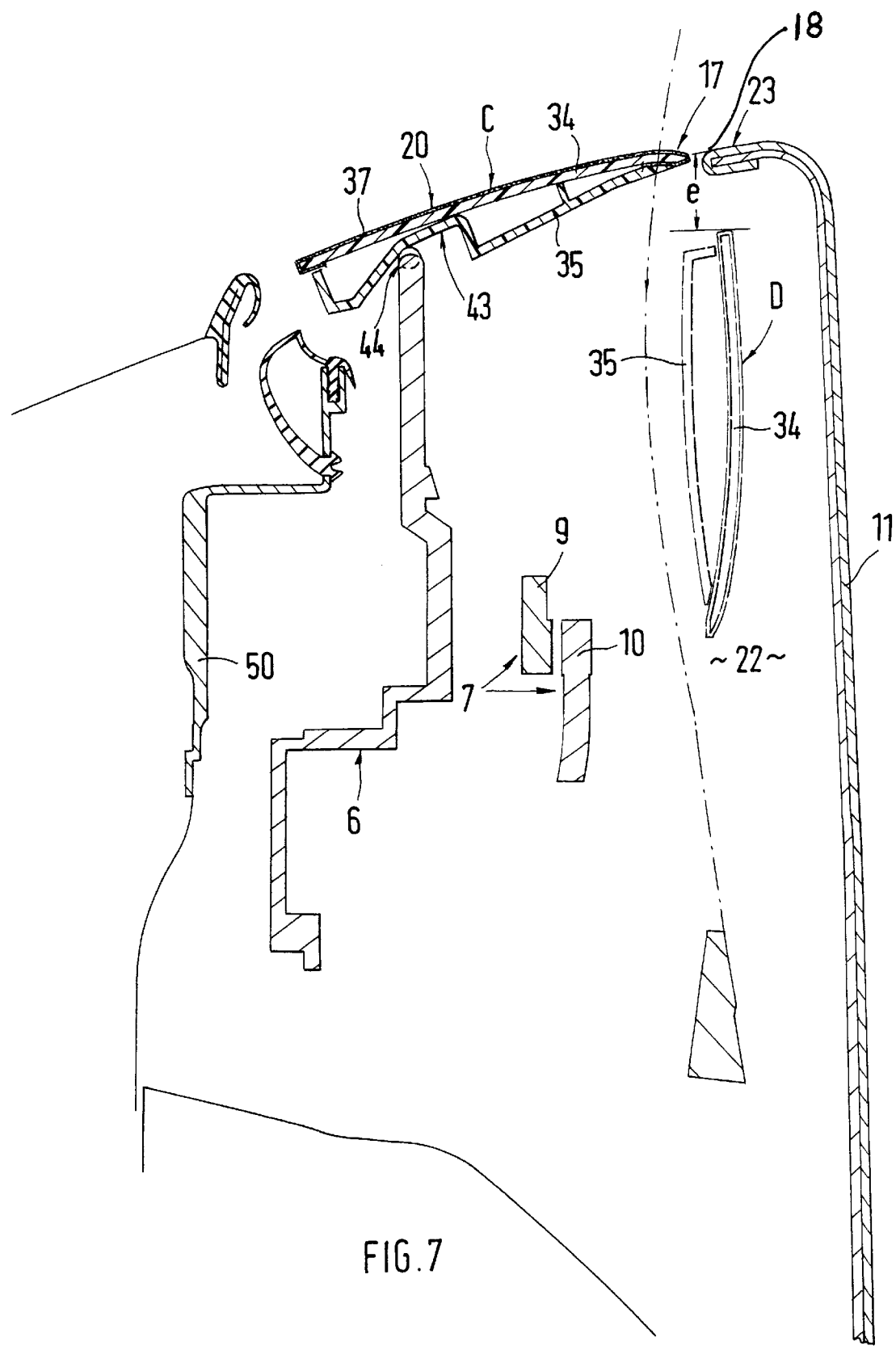
FIG. 7 is an enlarged sectional schematic view taken along Line VII—VII of FIG. 2.

In the embodiment shown, the folding top linkage 7 comprises a large-surface, dimensionally stable, forward folding top section 8 which, on its two longitudinal sides, is pivotally connected by way of two folding top control arms 9, 10 respectively forming a four-bar arrangement, to the folding top bases 6 fixed on the body side (FIG. 7).

According to FIG. 1, in its folded-back position B, the large-surface forward folding top section 8 forms a covering of the folding top compartment 4 which is disposed in front of the folding top compartment lid 5.

FIG. 1 shows the folding top compartment lid 5, the folded-back forward folding top section 8, a laterally exterior rear side panelling 11, a rear side window 12; and a rearward panelling 14 which covers in the upward direction a transversely extending frame 13 fastened on the body side; as well as a side part 15 of the vehicle body.

The two laterally exterior rearward side panellings 11 and the backrests of a rear seat system which are not shown in detail, are disposed in front of the auxiliary frame 13 (FIG. 10) and extend in the transverse direction to define the rearward side vehicle interior 16.

In each longitudinal side wall of the convertible, a passage opening 17 is provided through which the laterally exterior folding top control arms 9, 10 of the folding top linkage 7 project when the folding top 2 is closed. Only the left side opening 17 and associated structure is shown and described in detail herein. A right side passage opening 17 and associated structure is not shown as it is mirror symmetric to the left side.

Passage openings 17 which, because of the folding top kinematics, have a relatively large surface and are provided on both longitudinal sides of the vehicle, extend between an exterior edge of the transversely extending rearward panelling 14, the rearward edge area 18 of the associated rearward side panelling 11, the laterally exterior, longitudinally extending section 19 of the folding top compartment lid 5 and the adjoining section of the folded-back forward folding top section 8 and is bounded by these components.

When the folding top 2 is swivelled back (deposited position B), the passage opening 17 is largely closed by a cover flap 20. The cover flap 20, which can be moved from a covering position C by way of a combined rotating and linear movement into a release position D and vice-versa, according to the invention, is in an operative connection with a carriage-type guiding device 21 and extends in its upright release position D in a completely sunk-in manner below the passage opening 17 in a receiving space 22 formed between the deposited folding top 2 and the rear interior (FIG. 7).

In the release position D, the cover flap 20 is aligned approximately in parallel to the adjoining rear side panelling 11 and extends laterally beside the folding top control arms 9, 10 of the folding top linkage 7 (FIG. 7). In the release position D, the upper edge of the cover flap 20 extends at a distance e to a higher-situated, bent-out edge area 23 of the rearward side panelling 11.

Figure 10:
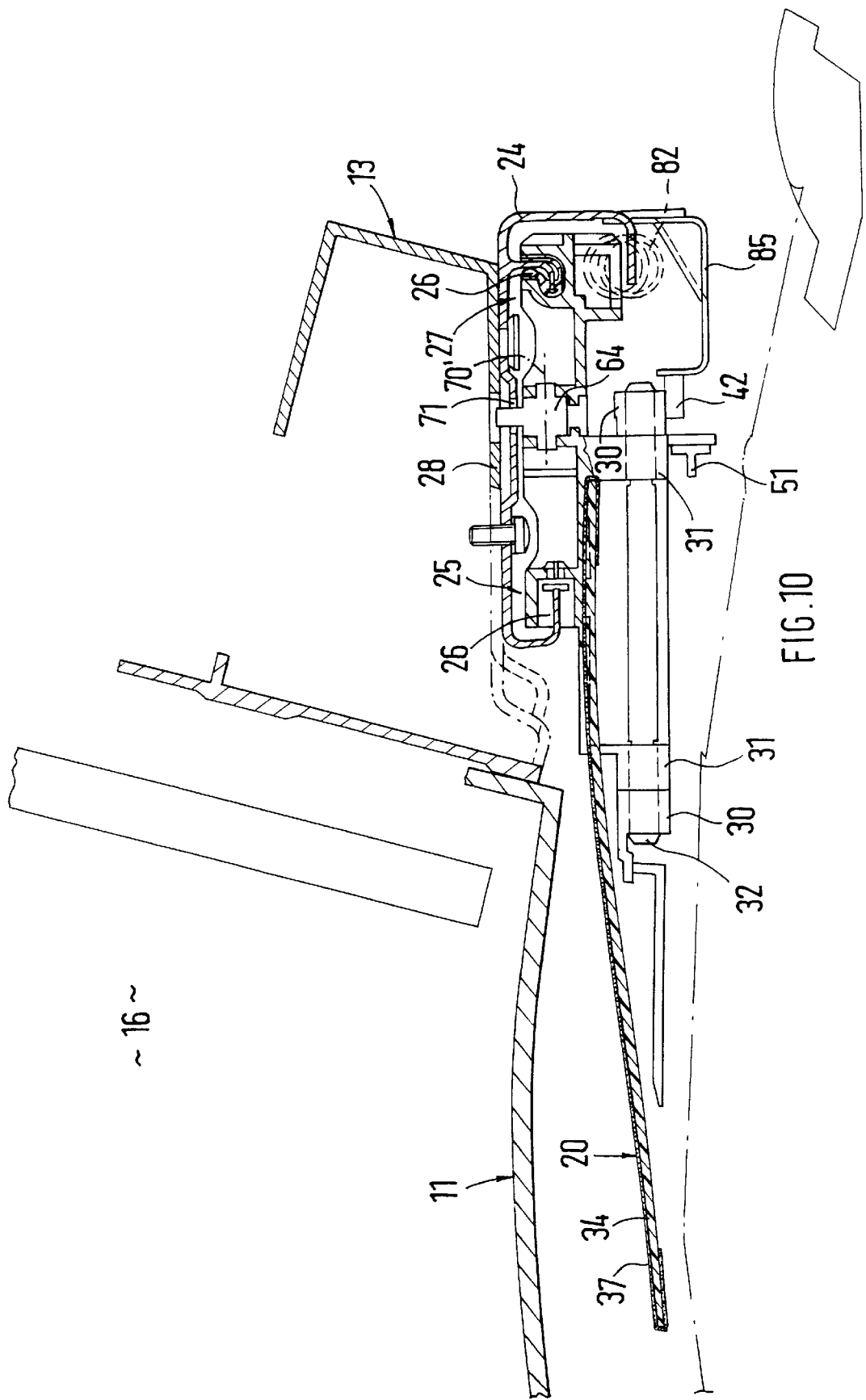
FIG. 10 is a horizontal sectional view of a lateral member of a body-side auxiliary frame with a guiding device fastened thereto.

The carriage-type guiding device 21 comprises a profiled support part 24 which is fixed on the body side and has an integrated guide rail 25 which extends in the upright direction and on which a carriage 27 is disposed in a vertically displaceable manner by means of sliding elements 26. In the embodiment shown, the guide rail 25 has an approximately C-shaped profile in the cross-sectional view. However, it may also have a different cross-sectional shape. The supporting part 24 and the guide rail 25 are preferably combined to form a common component (for example, an extruded profile or a cast part). The supporting part 24 with the guide rail 25 is held in position on an adjoining, laterally exterior, vertical member 28 of the transversely extending auxiliary frame 13. For this purpose, the supporting part 24 with the guide rail 25 is placed on the vertical exterior surface of the member 28, which is aligned in the longitudinal direction of the vehicle, and is connected with the auxiliary frame 13 by means of screws or the like (FIG. 10). The carriage 27, which is slidably accommodated in the guide rail 25, is swivellably connected with the cover flap 20 by means of a laterally molded-on receiving section 29.

For this purpose, two spaced gudgeons 30 and 31 respectively are constructed on the cover flap 20 and on the carriage 27 which are each provided with openings for guiding through an elongated hinge pin 32 defining a slightly diagonal pivot axis or axis of rotation 89. The gudgeons 30 of the cover flap 20 are farther removed from one another than those of the carriage 27 and rest in each case against the exterior side of the interior carriage-side gudgeons 31. The hinge pins 32 are secured locally against an axial displacement by means of fitted-on securing elements, which are not shown. Between the two interior, carriage-side gudgeons 31, the hinge pin 32 is surrounded by a spring element 33 which is supported with one bent end on the interior side of the cover flap 20 and with the other bent end on an upper wall section of the carriage 27 under prestress. The spring element 33 acts upon the cover flap 20 in the downward closing direction (covering position C).

Figure 5:
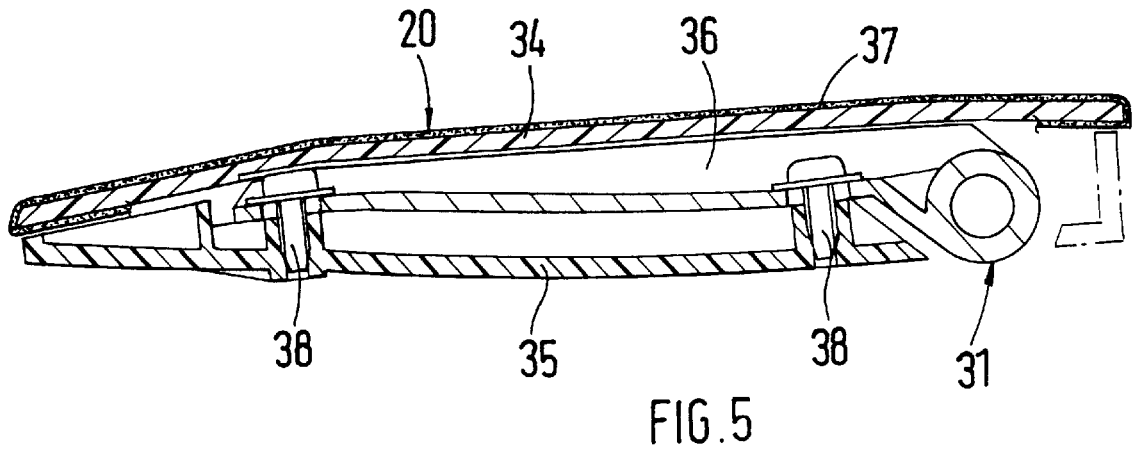
FIG. 5 is an enlarged sectional view taken along Line V—V of FIG. 3 rotated by 90°.

The cover flap 20 is composed of a top shell 34, a bottom shell 35 and an interposed hinge part 36 (FIG. 5).

On the exterior side, the top shell 34 is provided with a covering 37—for example, made of the folding top material—which extends in sections around the underside of the top shell 34.

Figure 4:
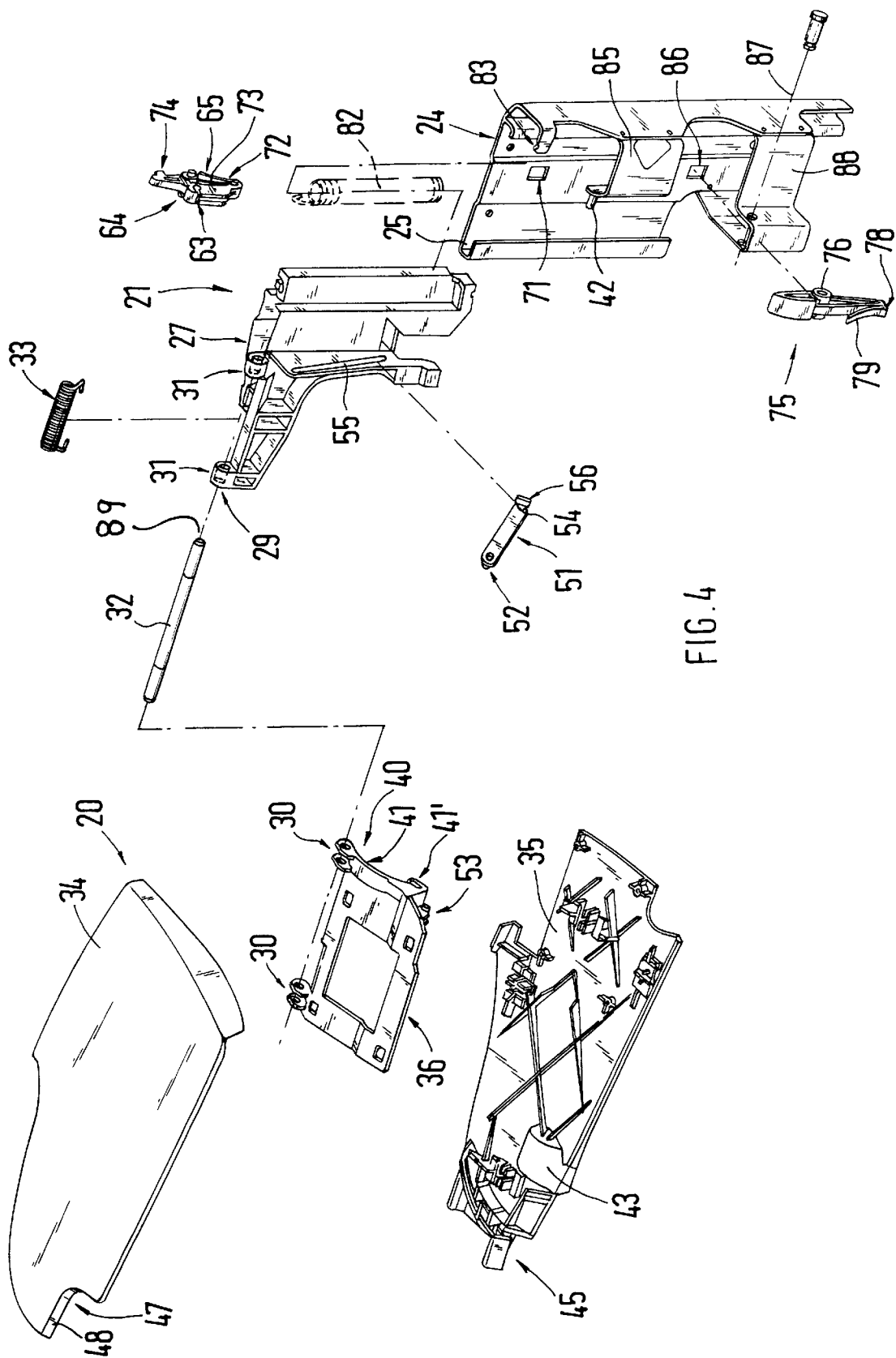
FIG. 4 is an exploded view of the cover flap and the guiding device for the cover flap.

The hinge part 36 arranged between the top shell 34 and the bottom shell 35 is held in position on the bottom shell 35 by means of fastening screws 38. In the embodiment shown, the spaced gudgeons 31 are constructed in one piece with the hinge part 36 (FIG. 4).

Figure 6:
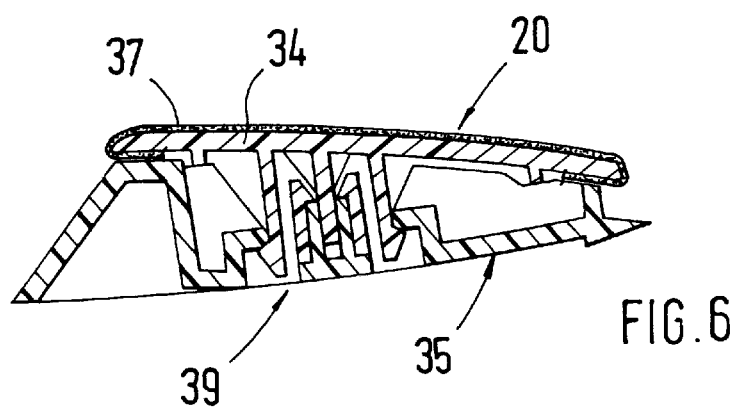
FIG. 6 is an enlarged sectional view taken along Line VI—VI of FIG. 3.

Together with the bottom shell 35, the hinge part 36 forms a prefabricated constructional unit to which the top shell 34 can be fastened. For achieving a uniform, circumference-side joint between the cover flap 20 and the adjoining components, the bottom shell 35, which is loosely connected with the hinge part 36, is adjusted by means of a gauge; then the fastening screws 38 are tightened; and finally the top shell is mounted. The top shell 34 is held in position on the bottom shell 35 by means of at least one clip connection 39 and/or a screwed connection or the like (FIG. 6). The top shell 34 and the bottom shell 35 are preferably formed by plastic parts and, for reasons of stiffness, of local reinforcing ribs (FIG. 4).

On the bottom side of the cover plate 20 or on the hinge part 36, at least one cam plate is constructed which, when the cover flap 20 is moved from the covering position C into the release position D, interacts at least at times with a corresponding stationary counterpart on the body side. In the embodiment shown, a first cam plate 41 is provided in an exterior area 40 of the hinge part 36, which cam plate 41 interacts with a projecting pin 42 mounted on the supporting part 24. The first cam plate 41 extends as an extension of one gudgeon 30 of the hinge part 36 and extends in the transverse direction of the vehicle. The end of the cam plate 41 facing away from the gudgeon 30 has an end-side detent nose.

The projecting pin 42 is aligned approximately horizontally and extends in the longitudinal direction of the vehicle. It is mounted on the supporting part 24. The pin 42 rests against the underside of the cam plate 41.

On the bottom side of the cover flap 20 or on the bottom shell 35, at a distance from the first cam plate 41, a second cam plate 43 is arranged which interacts with a guide member 44 bent away in the upward direction from the folding top base 6 (FIGS. 4 and 7).

Figure 2:
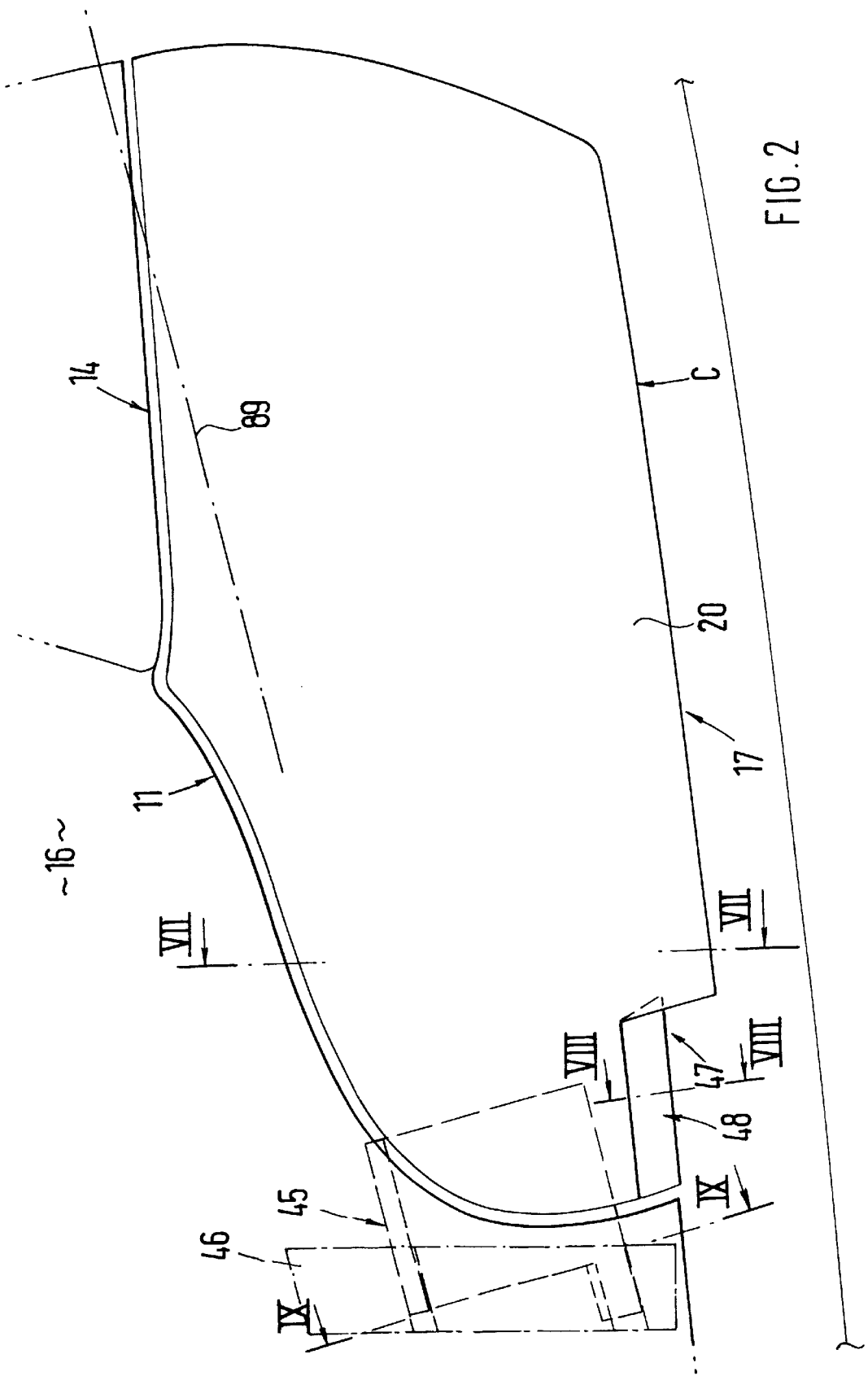
FIG. 2 is an enlarged view of a detail X of FIG. 1.
Figure 3:
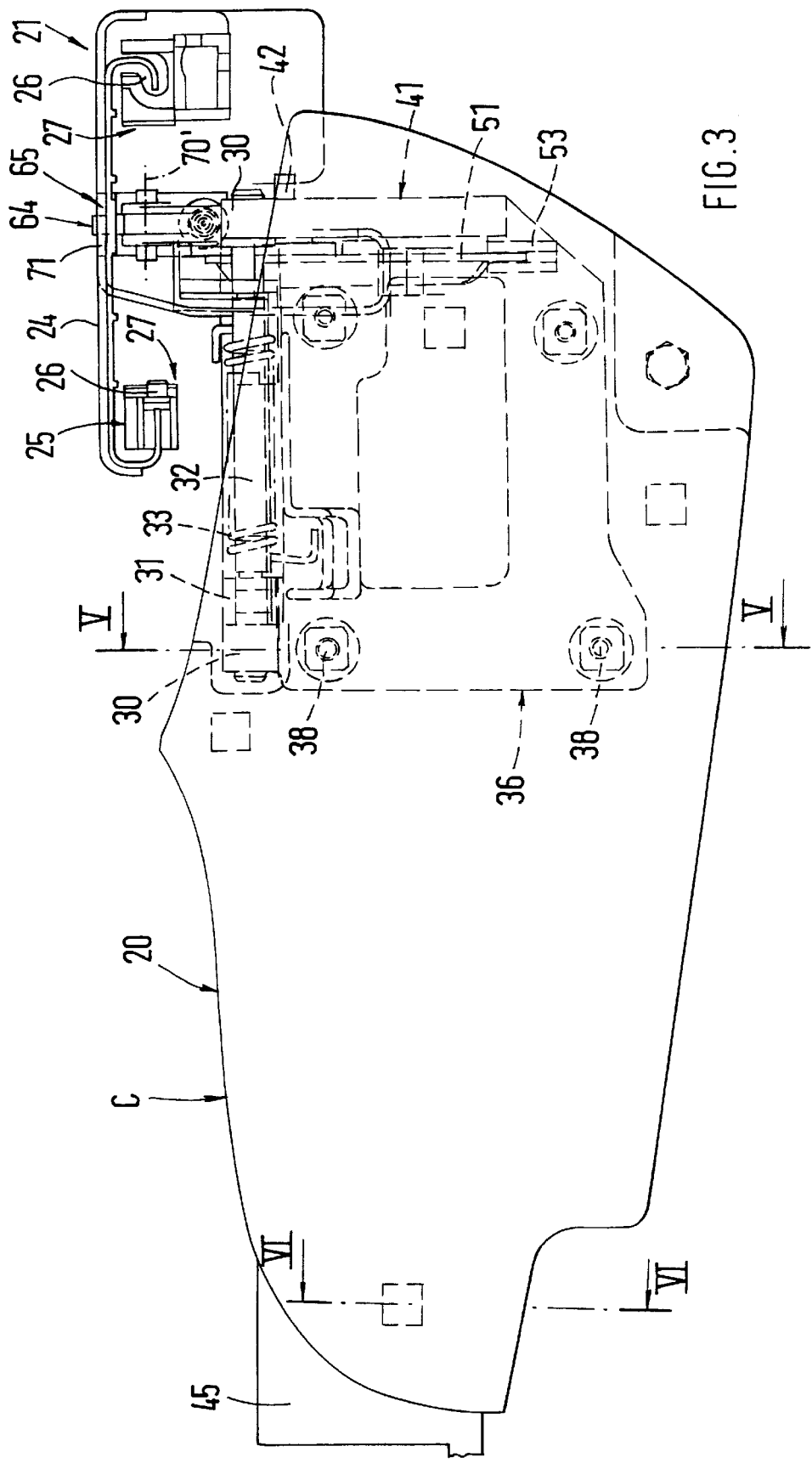
FIG. 3 is a top view of the cover flap and the guiding device in the covering position C of the cover flap.
Figure 9:
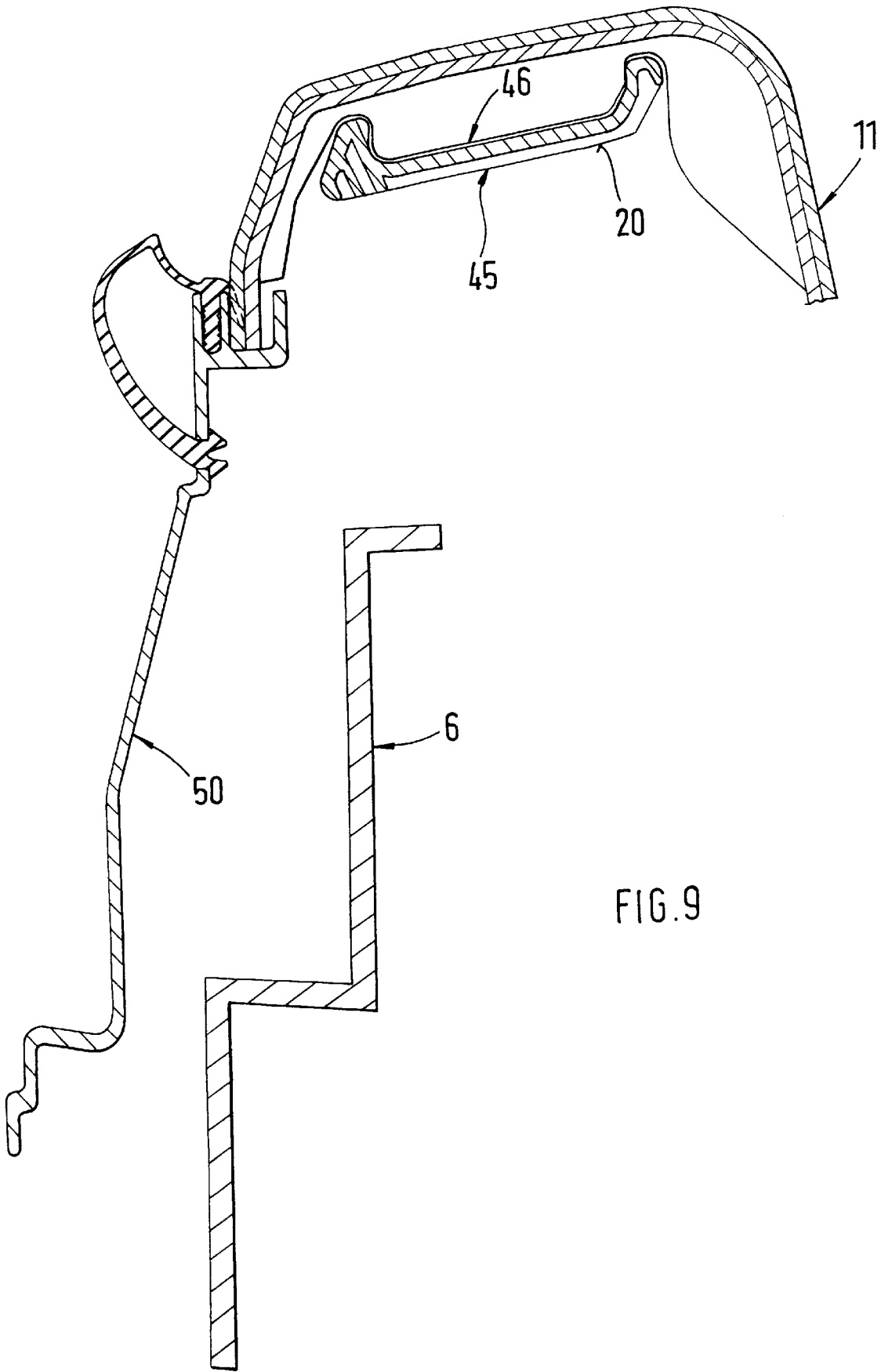
FIG. 9 is an enlarged sectional schematic view taken along Line IX—IX of FIG. 2.

The two cam plates 41, 43 and the counterparts (pin 42, guide member 44) interacting with them control the rotating or swivelling motion of the cover flap 20. Furthermore, the cover flap 20 has at least one projected molded-on part 45 on its end facing away from the guiding device 21, which molded-on part 45, in the covering position of the cover flap 20 engages in a form-locking manner in a receiving device 46 of the adjoining rearward-side panelling 11 (FIGS. 2 and 9). The molded-on part 45 has an offset height with respect to the top side of the cover flap 20 and extends lower than the latter. The molded-on part 45 is moved from below against the receiving device 46. In the embodiment shown, the molded-on part 45 is provided on the bottom shell 35.

Figure 8:
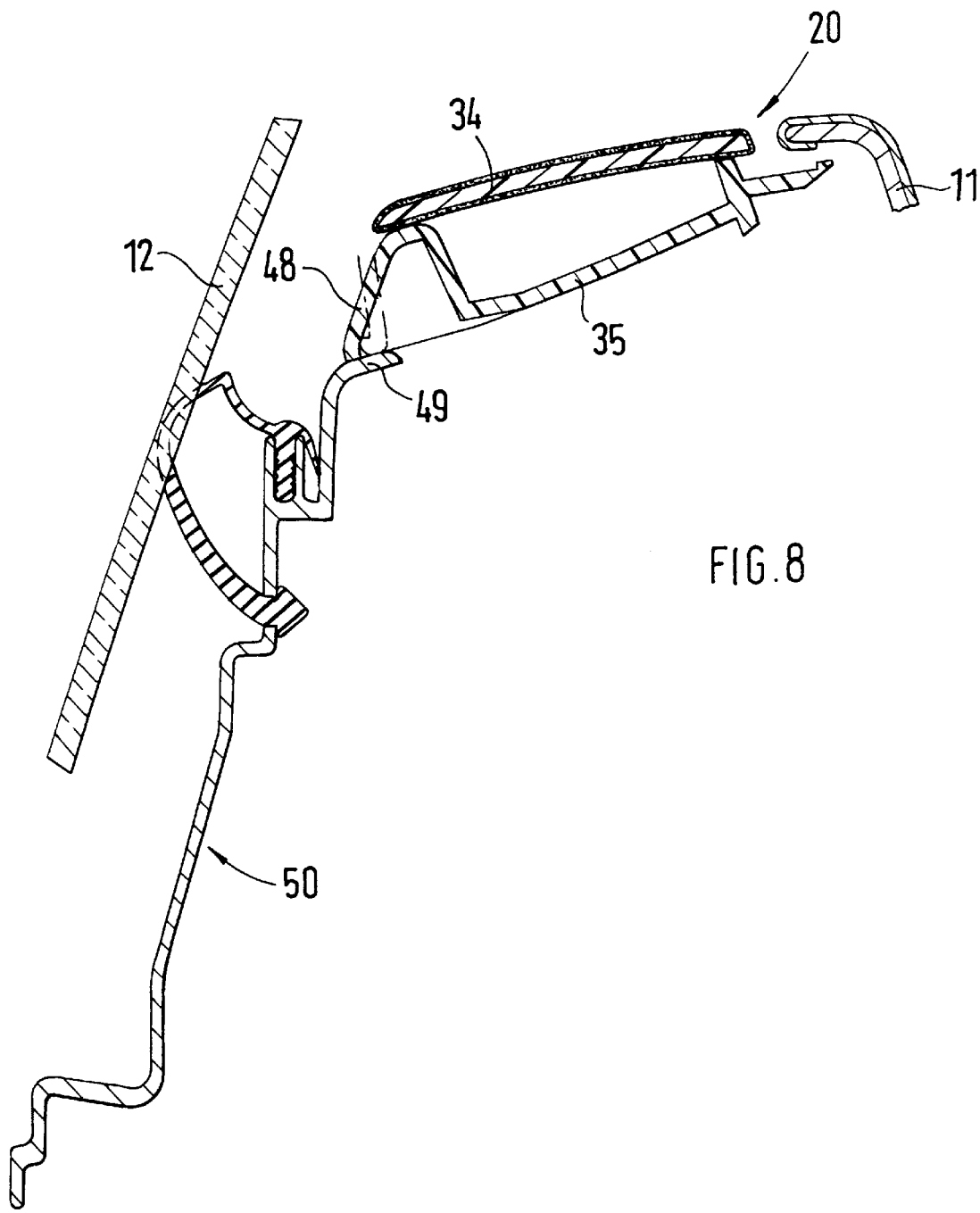
FIG. 8 is an enlarged schematic sectional view taken along to Line VIII—VIII of FIG. 2.

Adjacent to the molded-on part 45, an upright longitudinally extending web 48 is molded on to the cover flap 20, specifically in the area of a corner-side recess 47 for the rearward side window 12, which web 48 rests, by means of its bottom edge area, on a pulled-up supporting flange 49 of a panelling 50 (FIG. 8).

On the cover flap 20, a supporting control arm 51 is provided adjacent to the edge-side first cam plate 41 and connects the cover flap 20 with the carriage 27.

On its one end, the supporting control arm 51 is rotatably connected by way of pin sections 52 with a bearing lug 53 of the cover flap 20. The bearing lug 53 is also integrated into the hinge part 36. The pin sections 52 are clipped into the bearing lug 53.

Figure 11:
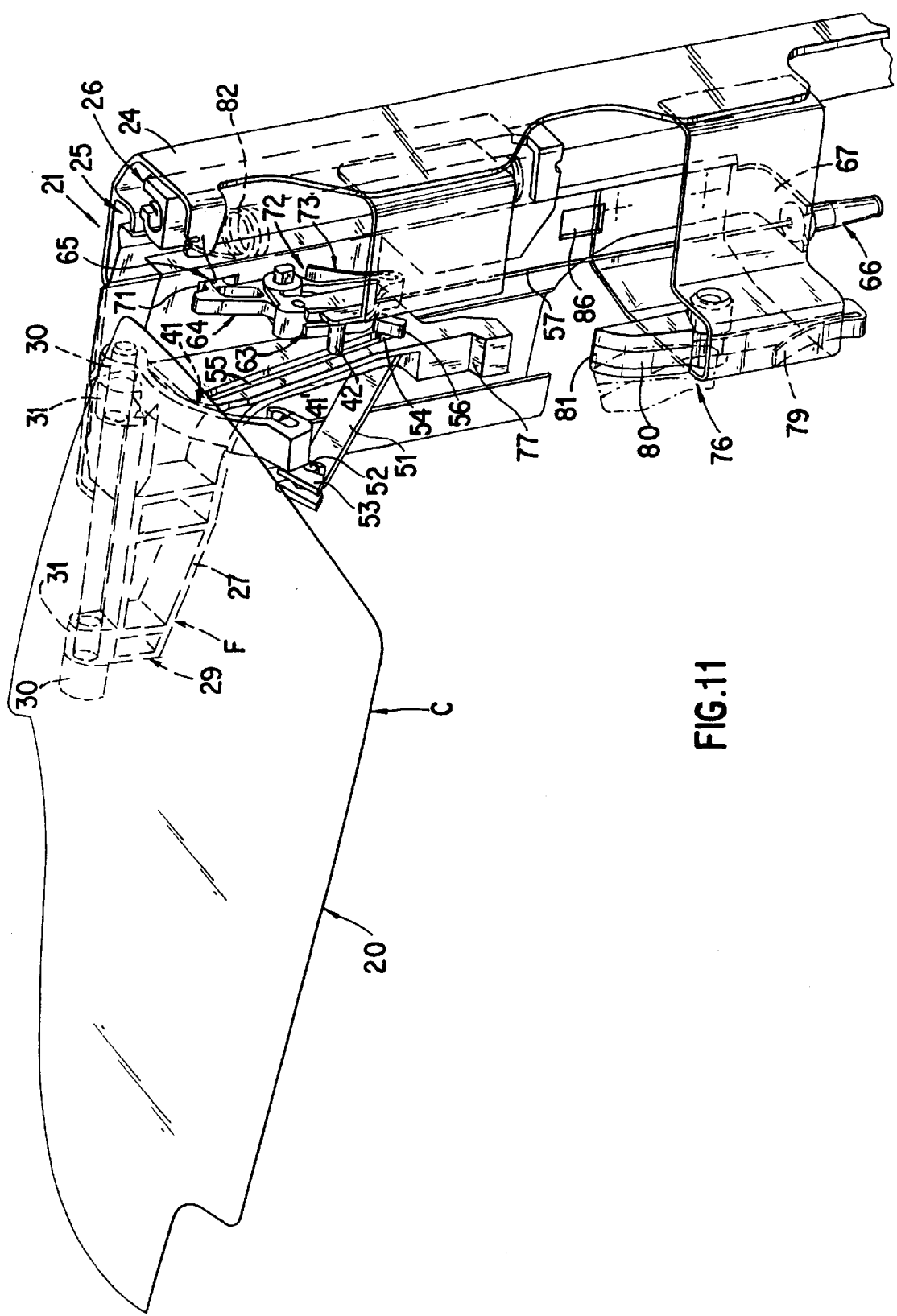
FIG. 11 is a perspective view diagonally from the rear of the cover flap and the guiding device in the covering position.

A bent-away hinge pin 54 provided on the other end of the supporting control arm 51 projects through an upright oblong slot 55 of the carriage 27 and is displaceably disposed therein. The supporting control arm 51 is formed by a plastic part. The hinge pin 54 facing the carriage 27 has, as an axial securing device, a narrow oblong molded-on part 56, in which case the molded-on part 56 can be guided through the slot 55 during the mounting of the supporting control arm 51. Then the supporting control arm 51 is swivelled so that the molded-on part 56 extends transversely to the slot 54 and projects over it—viewed along the width. In the embodiment shown, in the cross-sectional view, the supporting control arm 51 has an approximately T-shaped profile (FIG. 11).

Figure 12:
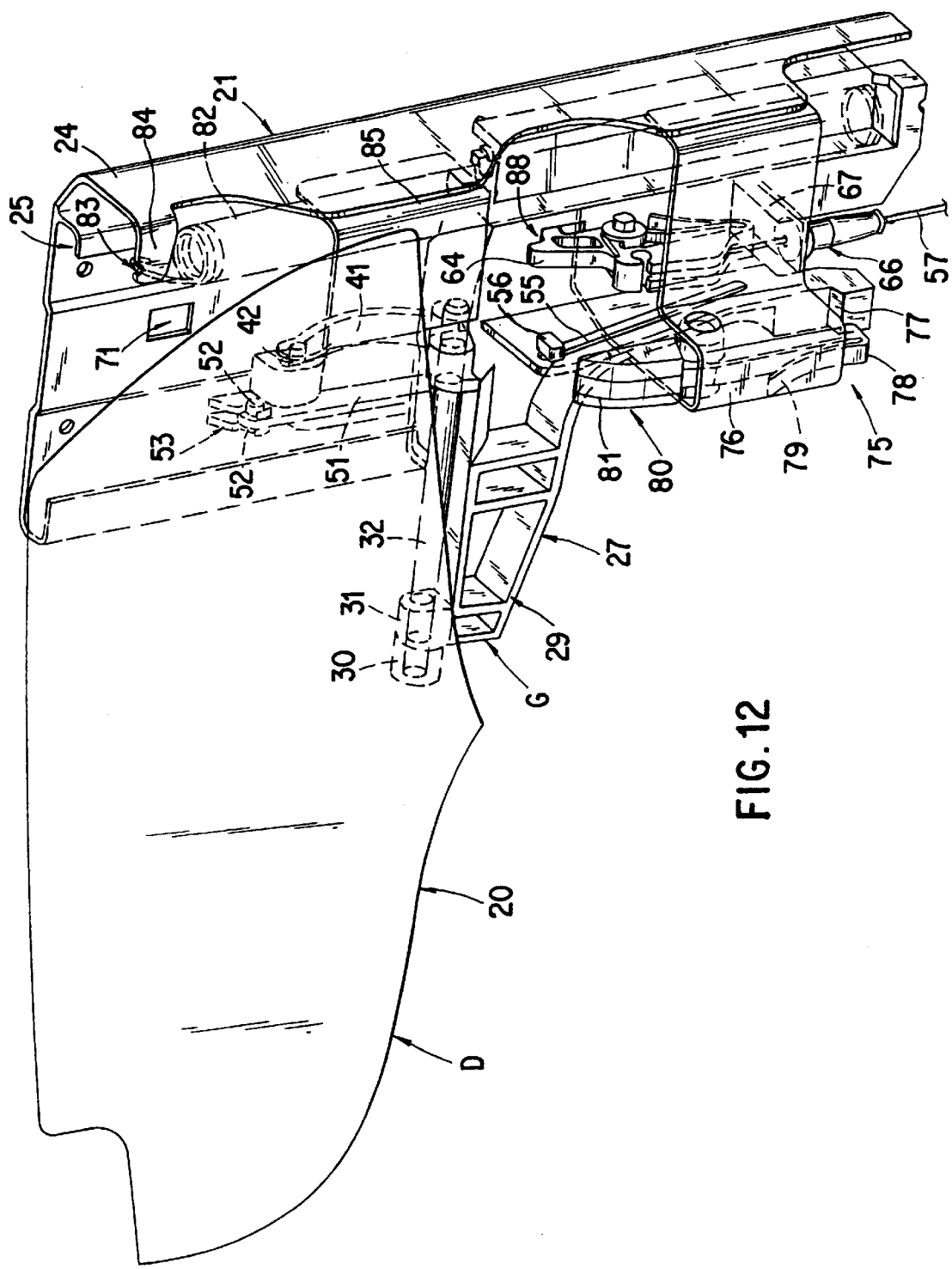
FIG. 12 is a perspective view diagonally from the rear of the cover flap and the guiding device in the upright, sunk release position of the cover flap.

The movement of the carriage-type guiding device 21 or of the cover flap 20 is connected to the kinematics of the adjoining folding top compartment lid 5 in such a manner that, when the folding top compartment lid 5 is opened, the cover flap 20 is moved automatically from the covering position C into the release position D, in which case the carriage 27 connected with the cover flap 20, in the guiding device 21, carries out a vertical linear displacement movement from an upper end position F (FIG. 11) in the downward direction into a lower end position G (FIG. 12).

Figure 13:
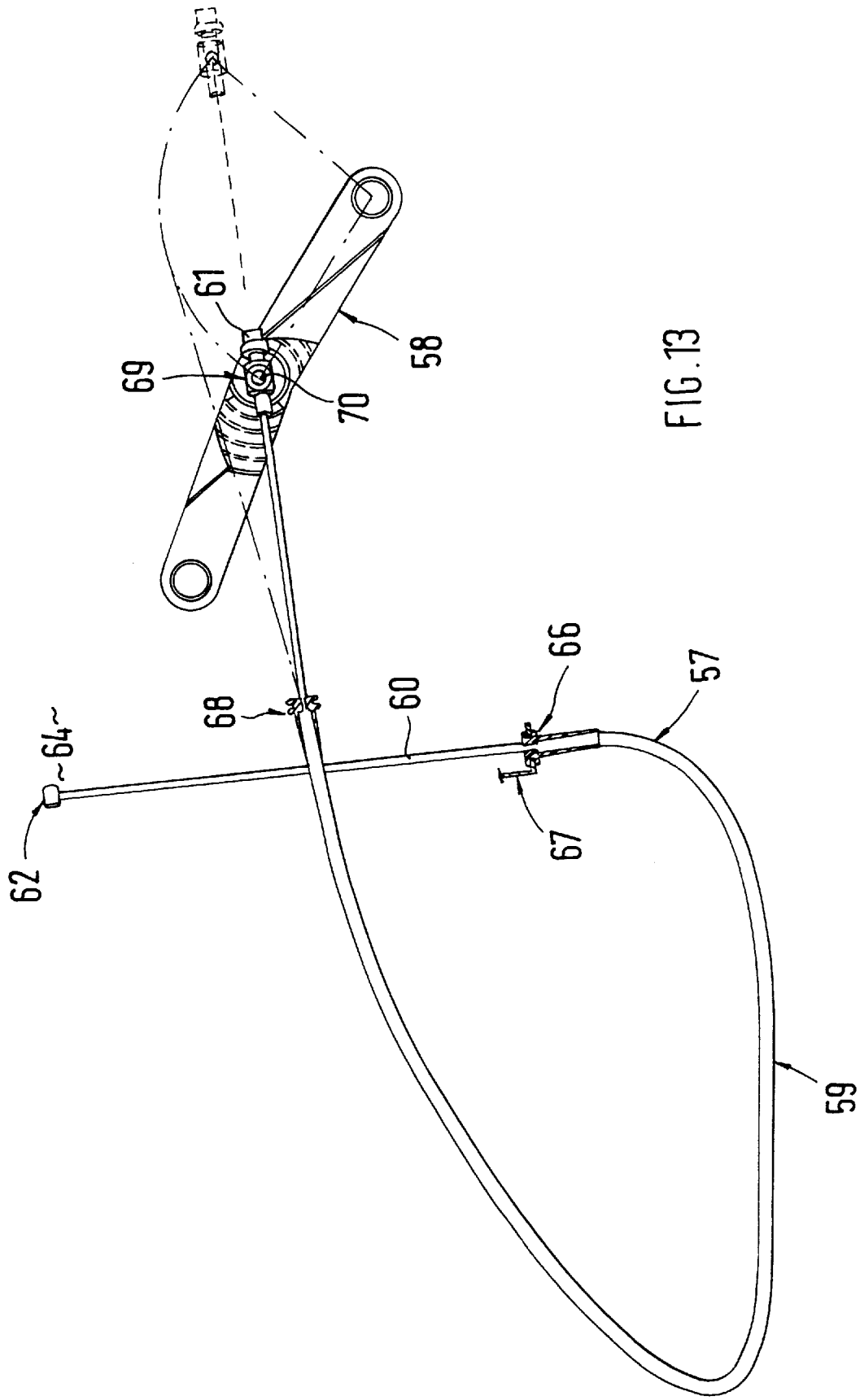
FIG. 13 is a lateral view of the Bowden cable connecting the guiding device with the hinge of the folding top compartment lid.

On its two longitudinal sides, the folding top compartment lid 5 is connected with the stationary body by means of two control arms which are not shown in detail. By way of a Bowden cable 57, each carriage-type guiding device 21 is connected with the control arm, for example, 58, of the four-bar hinge of the folding top compartment lid which is situated in front—viewed in the driving direction (FIG. 13).

The Bowden cable 57 comprises a jacket 59 and a wire 60 extending therein, in which case the wire 60 projecting over the jacket 59 has a nipple 61 on one end and is connected with a transversely extending cylindrical body 62 on the other end.

The cylindrical body 62 forming one end of the wire 60 is hung into a corresponding receiving device 63 of a swivellable detent hook 64 of a first detachable lock 65. The end 66 of the jacket 59 facing the body 62 is fixed on a slotted tongue 67 arranged on the lower end of the supporting part 24.

The other end 68 of the jacket 59 is locally fastened to the body (not shown in detail). Between the end 68 of the jacket 59 and the end-side nipple 61, the wire 60 is guided through a receiving element 69 which is inserted by means of a projecting cylindrical projection 70 into an opening of the control arm 58. The receiving element 69 is swivellably disposed on the control arm 58 (FIG. 13).

When the folding top compartment lid 5 is closed and when the cover flap 20 is closed, the carriage 27 is fixed in its upper end position F by way of the first releasable lock 65. The nipple 61 of the Bowden cable 57 rests against the exterior side of the receiving element 69 (FIG. 13). By moving the folding top compartment lid 5 into its open position, the Bowden cable 57 is tightened and the first releasable lock 65 is unlocked.

The first locking device 65 comprises a detent hook 64 disposed on the carriage 27 about a horizontal longitudinally directed axis of rotation 70', which detent hook 64 engages in the locked position in a window-type recess 71 of the supporting part 24. On the spring-loaded detent hook 64, the cylindrical receiving device 63 is provided for the hanging-in of the cylindrical body 62 of the Bowden cable 57. The spring element 72 for the detent hook 64 can be formed by a leg spring or a one-piece, leaf-spring-type molded-on part 73 of the detent hook 64.

During the unlocking of the Bowden cable 57, a nose-type projection 74 of the detent hook 64 disengages from the window-type recess 71.

The lower end position of the carriage 27 is determined by a second releasable lock 75. This lock 75 comprises a spring-loaded detent pawl 76 which is swivellably disposed on the supporting part 24 and interacts, in the locked position, with a step-shaped shoulder 77 of the carriage 27. The lower end 78 of the detent pawl 76 rests on the shoulder 77 of the carriage 27 situated below and holds the cover flap 20 in the lower position when the folding top is closed. The spring element for the detent pawl 76 is formed by a one-piece, leaf-spring-type molded-on part 79 which rests under prestress against the interior side of the supporting part 24.

The detent pawl 76 has the shape of an angle lever, the upward-projecting lever arm 80 having an end-side stop surface 81. When the folding top linkage 7 is swivelled back, it reaches a form-locking engagement with the stop surface 81 and swivels the detent pawl 76 so that the latter disengages from the carriage 27.

By way of an upright tension spring 82, the carriage 27 is connected with the supporting part 24, in which case the tension spring 82 moves the carriage 27 into its upper end position. A lower end of the tension spring 82 is fixed to the underside of the carriage 27. The upper end of the tension spring 82 is hung into a notch 83 of a tongue 84 mounted on the upper edge of the supporting part 24.

The projecting pin 42 is mounted on a bent sheet metal part 85 which is fixedly connected with the supporting part 24 (by means of welding, riveting or the like). In the lower end position of the carriage 27, the detent hook 64 engages in an additional recess 86 of the supporting part 24. The detent pawl 76 is disposed about a horizontal axis of rotation 87 on a profiled sheet metal part 88 which locally forms a closed frame with the supporting part 24. FIG. 2 illustrates the diagonally extending axis of rotation 89 of the flap 20.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An assembly for covering and uncovering a convertible passage opening through which control arms of a folding top linkage project when a retractable convertible folding top is closed, comprising:

a cover flap, a movable carriage connected to the cover flap at a pivot connection defining a cover flap pivot axis, said movable carriage being operable to move the cover flap between a closed position covering the passage opening and an open retracted position disposed below a top of the passage opening, a supporting part in which said movable carriage is slidably accommodated, cams defined on said cover flap, and a linking member which produces movement of the movable carriage relative to said supporting part so that the cams control rotating movement of the cover flap about the cover flap pivot axis as the linking member lowers the cover flap pivot axis into the passage opening and the cover flap moves from the closed position to the open retracted position, wherein the cover flap pivot axis is a diagonally extending axis located at an upper edge section of the carriage which extends diagonally with respect to a longitudinal axis of a vehicle having the convertible top, and wherein the pivot connection includes a hinge pin surrounded in sections by a spring element which is supported with one end on a hinge part of the cover flap and with the other end on an upper wall section of the carriage under prestress pushing the cover flap downward in a closing direction.

2. An assembly for covering and uncovering a convertible passage opening through which control arms of a folding top linkage project when a retractable convertible folding top is closed, comprising:

a cover flap, a movable carriage connected to the cover flap at a pivot connection defining a cover flap pivot axis, said movable carriage being operable to move the cover flap between a closed position covering the passage opening and an open retracted position disposed below a top of the passage opening, a supporting part in which said movable carriage is slidably accommodated, cams defined on said cover flap, and a linking member which produces movement of the movable carriage relative to said supporting part so that the cams control rotating movement of the cover flap about the cover flap pivot axis as the linking member lowers the cover flap pivot axis into the passage opening and the cover flap moves from the closed position to the open retracted position, wherein the cover flap is composed of a top shell, a bottom shell and a hinge part, and wherein the cams include a first cam plate which is arranged on the hinge part, which first cam plate is in an operative connection with a projecting pin provided on the supporting part.

3. An assembly according to claim 2, wherein the cams include a second cam plate which is provided on the bottom shell, which second cam plate interacts with a guide member which is bent away in an upward direction from a base of the folding top and is rounded on the upper end.

4. An assembly for covering and uncovering a convertible passage opening through which control arms of a folding top linkage project when a retractable convertible folding top is closed, comprising:

a cover flap, a movable carriage connected to the cover flat at a pivot connection defining a cover flap pivot axis, said movable carriage being operable to move the cover flap between a closed position covering the passage opening and an open retracted position disposed below a top of the passage opening, a supporting part in which said movable carriage is slidably accommodated, cams defined on said cover flaps, and a linking member which produces movement of the movable carriage relative to said supporting part so that the cams control rotating movement of the cover flap about the cover flap pivot axis as the linking member lowers the cover flap pivot axis into the passage opening and the cover flap moves from the closed position to the open retracted position, wherein at least one projecting molded-on part is provided on the cover flap on an end area facing away from the carriage, said projecting molded-on part being configured to engage in a form-locking manner in a receiving device of an adjoining rearward side vehicle panelling when the cover flap is in the closed position, the molded-on part reaching under the receiving device which is open in the downward direction.

5. An assembly for covering and uncovering a convertible passage opening through which control arms of a folding top linkage project when a retractable convertible folding top is closed, comprising:

a cover flap, a movable carriage connected to the cover flap at a pivot connection defining a cover flap pivot axis, said movable carriage being operable to move the cover flap between a closed position covering the passage opening and an open retracted position disposed below a top of the passage opening, a supporting part in which said movable carriage is slidably accommodated, cams defined on said cover flap, and a linking member which produces movement of the movable carriage relative to said supporting part so that the cams control rotating movement of the cover flap about the cover flap pivot axis as the linking member lowers the cover flap pivot axis into the passage opening and the cover flap moves from the closed position to the open retracted position, wherein the supporting part is a carriage-type guiding device and, in use, is fixed on a vehicle body side and has an integrated upright guide rail on which the carriage is accommodated in a vertically displaceable manner by sliding elements, and wherein the carriage is fixable by way of a first releasable lock in its upper end position on the supporting part.

6. An assembly according to claim 5, wherein the first releasable lock comprises a spring-loaded detent hook which is swivellably disposed on the carriage and engages, in a locking position, in a recess of the supporting part.

7. An assembly according to claim 6, wherein said linking member is a Bowden cable which connects the carriage with a hinge of a folding top compartment lid.

8. An assembly according to claim 7, wherein the Bowden cable is connected on one side on a control arm of the hinge and on another side on a spring-loaded detent hook of the first releasable lock.

9. An assembly according to claim 5, wherein a lower end position of the carriage is determined by a second releasable lock.

10. An assembly according to claim 9, wherein the second releasable lock comprises a spring-loaded detent pawl which is swivellably disposed on the supporting part and which, in a locking position, rests in a form-locking manner on a step-shaped shoulder of the carriage.

11. An assembly according to claim 10, wherein the detent pawl has an upward-projecting lever arm with a stop surface for contacting said linkage when the folding top linkage is swivelled back, whereby the detent pawl is swivelled and disengages from the step-shaped shoulder of the carriage.

12. An assembly for covering and uncovering a convertible passage opening through which control arms of a folding top linkage project when a retractable convertible folding top is closed, comprising:

a cover flap, a movable carriage connected to the cover flap at a pivot connection defining a cover flap pivot axis, said movable carriage being operable to move the cover flap between a closed position covering the passage opening and an open retracted position disposed below a top of the passage opening, a supporting part in which said movable carriage is slidably accommodated, cams defined on said cover flaps, and a linking member which produces movement of the movable carriage relative to said supporting part so that the cams control rotating movement of the cover flap about the cover flap pivot axis as the linking member lowers the cover flap pivot axis into the passage opening and the cover flap moves from the closed position to the open retracted position, wherein the cover flap is connected by way of a supporting control arm with the carriage, one end of the supporting control arm being rotatably connected with the cover flap, and wherein a bent-away hinge pin of the supporting control arm is guided through an oblong slot of the carriage and is slidably disposed therein.

13. An assembly for covering and uncovering a convertible passage opening through which control arms of a folding top linkage project when a retractable convertible folding top is closed, comprising:

a cover flap, a movable carriage connected to the cover flap at a pivot connection defining a cover flap pivot axis, said movable carriage being operable to move the cover flap between a closed position covering the passage opening and an open retracted position disposed below a top of the passage opening, a supporting part in which said movable carriage is slidably accommodated, cams defined on said cover flap, and a linking member which produces movement of the movable carriage relative to said supporting part so that the cams control rotating movement of the cover flap about the cover flap pivot axis as the linking member lowers the cover flap pivot axis into the passage opening and the cover flap moves from the closed position to the open retracted position, wherein the supporting part is a carriage-type guiding device and, in use, is fixed on a vehicle body side and has an integrated upright guide rail on which the carriage is accommodated in a vertically displaceable manner by sliding elements, and wherein the carriage is connected with the supporting part by way of an upright tension spring, the tension spring acting upon the carriage in the upward direction towards its upper end position.

14. An assembly for covering and uncovering a convertible passage opening through which control arms of a folding top linkage project when a retractable convertible folding top is closed, comprising:

a cover flap, a movable carriage connected to the cover flap at a pivot connection defining a cover flap pivot axis, said movable carriage being operable to move the cover flap between a closed position covering the passage opening and an open retracted position disposed below a top of the passage opening, a supporting part in which said movable carriage is slidably accommodated, cams defined on said cover flaps, and a linking member which produces movement of the movable carriage relative to said supporting part so that the cams control rotating movement of the cover flap about the cover flap pivot axis as the linking member lowers the cover flap pivot axis into the passage opening and the cover flap moves from the closed position to the open retracted position, wherein said movable carriage is guided to move substantially vertically during movement of the cover flap between the closed and open retracted positions, wherein a carriage-type guiding device is provided which comprises a profiled supporting part which in use is fixed on a vehicle body side and has an integrated upright guide rail on which the carriage is accommodated in a vertically displaceable manner by sliding elements, wherein the cover flap pivot axis is a diagonally extending axis located at an upper edge section of the carriage which extends diagonally with respect to a longitudinal axis of a vehicle having the convertible top, and wherein the pivot connection includes a hinge pin surrounded in sections by a spring element which is supported with one end on a hinge part of the cover flap and with the other end on an upper wall section of the carriage under prestress pushing the cover flap downward in a closing direction.

15. An assembly for covering and uncovering a convertible passage opening through which control arms of a folding top linkage project when a retractable convertible folding top is closed, comprising:

a cover flap, a movable carriage connected to the cover flap at a pivot connection defining a cover flap pivot axis, said movable carriage being operable to move the cover flap between a closed position covering the passage opening and an open retracted position disposed below a top of the passage opening, a supporting part in which said movable carriage is slidably accommodated, cams defined on said cover flaps, and a linking member which produces movement of the movable carriage relative to said supporting part so that the cams control rotating movement of the cover flap about the cover flap pivot axis as the linking member lowers the cover flap pivot axis into the passage opening and the cover flap moves from the closed position to the open retracted position, wherein said movable carriage is guided to move substantially vertically during movement of the cover flap between the closed and open retracted positions, wherein a carriage-type guiding device is provided which comprises a profiled supporting part which in use is fixed on a vehicle body side and has an integrated upright guide rail on which the carriage is accommodated in a vertically displaceable manner by sliding elements, wherein the cover flap is composed of a top shell, a bottom shell and a hinge part, and wherein said cams include a first cam plate arranged on the hinge part, which cam plate is in an operative connection with a projecting pin provided on the supporting part.

16. An assembly according to claim 15, wherein said cams include a second cam plate provided on the bottom shell, which second cam plate interacts with a guide member which is bent away in the upward direction from a folding top base and is rounded on an upper end thereof.

17. An assembly according to claim 16, wherein at least one projecting molded-on part is provided on the cover flap on an end area facing away from the movable carriage, said projecting molded-on part being configured to engage in a form-locking manner in a receiving device of an adjoining rearward side vehicle panelling when the cover flap is in the closed position, the molded-on part reaching under the receiving device which is open in the downward direction.

18. An assembly according to claim 17, wherein the carriage is fixable by way of a first releasable lock in its upper end position on the supporting part.

19. An assembly according to claim 18, wherein the first releasable lock comprises a spring-loaded detent hook which is swivellably disposed on the carriage and engages in a locking position in a recess of the supporting part.

20. An assembly according to claim 19, wherein the linking member is a Bowden cable which connects the carriage with a hinge of a folding top compartment lid.

21. An assembly according to claim 20, wherein the Bowden cable is connected, on one side, on a pivot connection of said hinge and, on another side, on the spring-loaded detent hook of the first releasable lock.

22. An assembly according to claim 21, wherein a lower end position of the carriage is determined by a second releasable lock.

23. An assembly according to claim 22, wherein the second releasable lock comprises a spring-loaded detent pawl which is swivellably disposed on the supporting part and which, in a locking position, rests in a form-locking manner on a step-shaped shoulder of the carriage.

24. An assembly according to claim 23, wherein the detent pawl has an upward-projecting lever arm with a stop surface for contacting said folding top linkage when the folding top linkage is swivelled back, whereby the detent pawl is swivelled and disengages from the step-shaped shoulder of the carriage.

25. An assembly for covering and uncovering a convertible passage opening through which control arms of a folding top linkage project when a retractable convertible folding top is closed, comprising:

a cover flap, a movable carriage connected to the cover flap at a pivot connection defining a cover flap pivot axis, said movable carriage being operable to move the cover flap between a closed position covering the passage opening and an open retracted position disposed below a top of the passage opening, a supporting part in which said movable carriage is slidably accommodated, cams defined on said cover flaps, and a linking member which produces movement of the movable carriage relative to said supporting part so that the cams control rotating movement of the cover flap about the cover flap pivot axis as the linking member lowers the cover flap pivot axis into the passage opening and the cover flap moves from the closed position to the open retracted position, wherein said movable carriage is guided to move substantially vertically during movement of the cover flap between the closed and open retracted positions, wherein a carriage-type guiding device is provided which comprises a profiled supporting part which in use is fixed on a vehicle body side and has an integrated upright guide rail on which the carriage is accommodated in a vertically displaceable manner by sliding elements, wherein the cover flap is connected by way of a supporting control arm with the carriage, one end of the supporting control arm being rotatably connected with the cover flap, and wherein a bent-away hinge pin of the supporting control arm is guided through an oblong slot of the carriage and is slidably disposed therein.

26. An assembly according to claim 24, wherein the cover flap is connected by way of a supporting control arm with the carriage, one end of the supporting control arm being rotatably connected with the cover flap, and wherein a bent-away hinge pin of the supporting control arm is guided through an oblong slot of the carriage and is slidably disposed therein.

27. An assembly for covering and uncovering a convertible passage opening through which control arms of a folding top linkage project when a retractable convertible folding top is closed, comprising:

a cover flap, a movable carriage connected to the cover flap at a pivot connection defining a cover flap pivot axis, said movable carriage being operable to move the cover flap between a closed position covering the passage opening and an open retracted position disposed below a top of the passage opening, a supporting part in which said movable carriage is slidably accommodated, cams defined on said cover flaps, and a linking member which produces movement of the movable carriage relative to said supporting part so that the cams control rotating movement of the cover flap about the cover flap pivot axis as the linking member lowers the cover flap pivot axis into the passage opening and the cover flap moves from the closed position to the open retracted position, wherein said movable carriage is guided to move substantially vertically during movement of the cover flap between the closed and open retracted positions, wherein a carriage-type guiding device is provided which comprises a profiled supporting part which in use is fixed on a vehicle body side and has an integrated upright guide rail on which the carriage is accommodated in a vertically displaceable manner by sliding elements, wherein the carriage is connected with the supporting part by way of an upright tension spring, the tension spring acting upon the carriage in the upward direction towards its upper end position.

28. An assembly according to claim 24, wherein the carriage is connected with the supporting part by way of an upright tension spring, the tension spring acting upon the carriage in the upward direction towards its upper end position.

29. An assembly according to claim 26, wherein the carriage is connected with the supporting part by way of an upright tension spring, the tension spring acting upon the carriage in the upward direction towards its upper end position.

* * * * *